April 13, 1965 R. CHUTE 3,177,735
ROTARY REGENERATOR DRIVING STRUCTURE
Original Filed Sept. 12, 1960 2 Sheets-Sheet 1
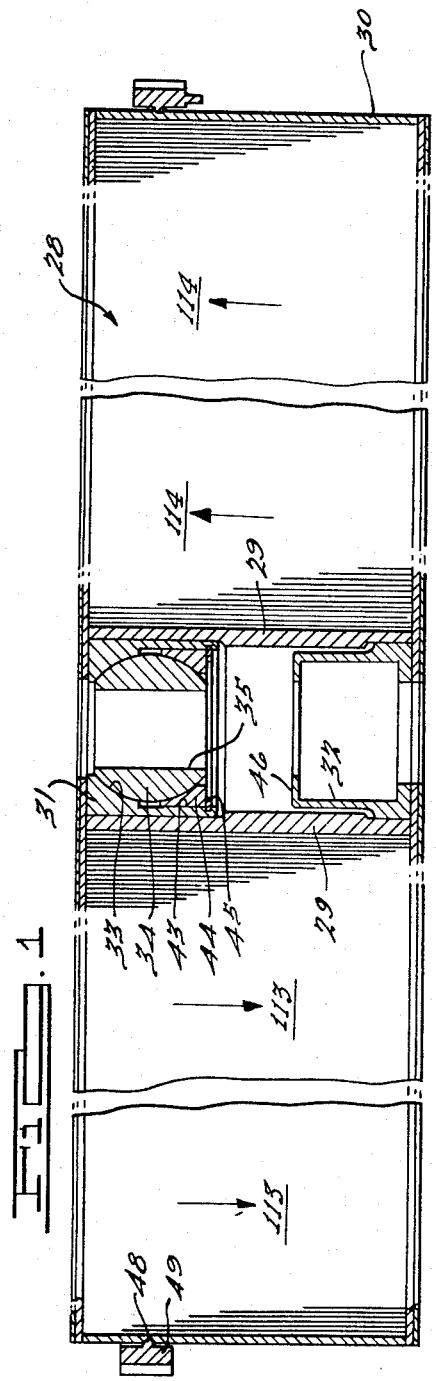
INVENTOR.
Richard Chute
BY
Harness & Harris
ATTORNEYS

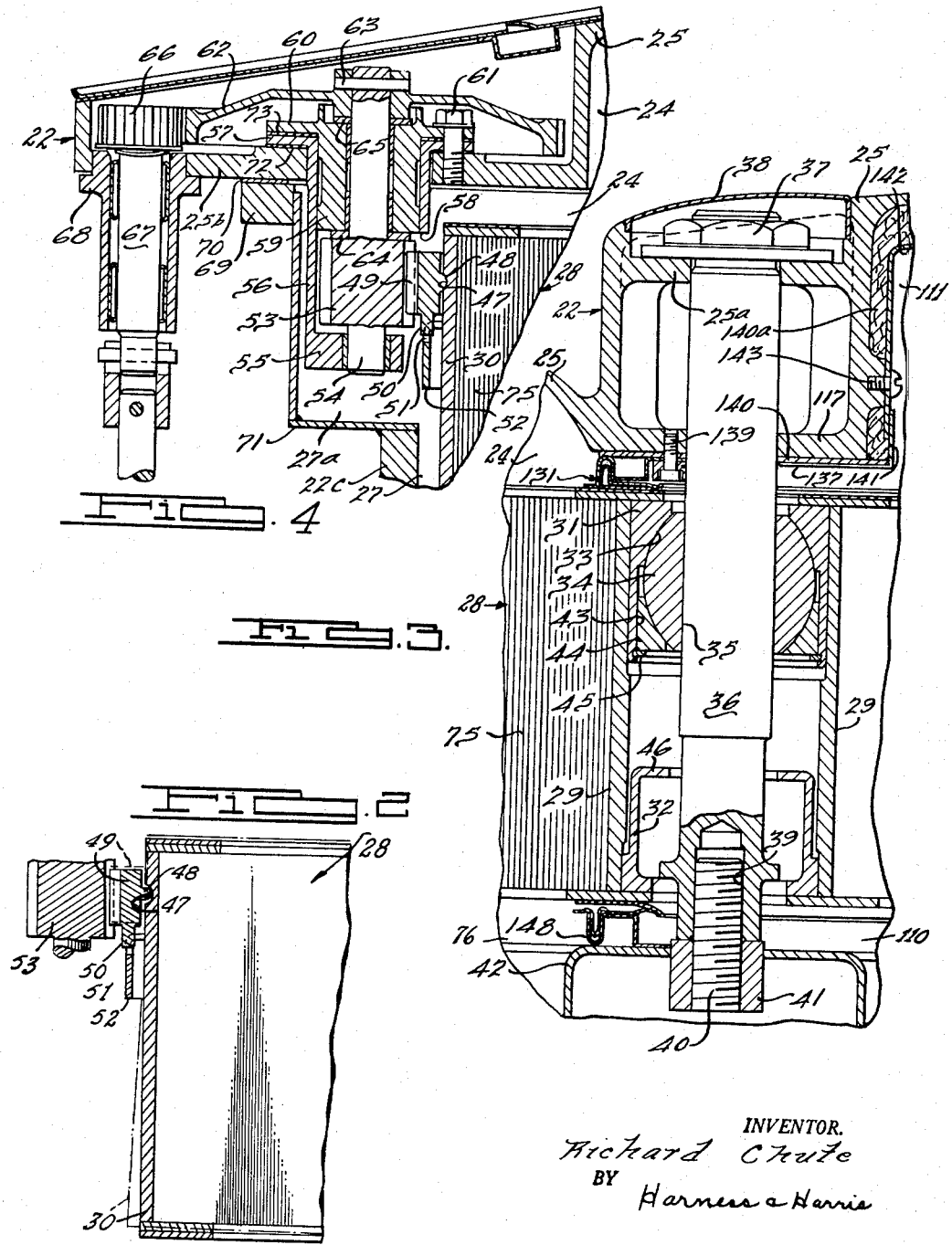

United States Patent Office 3,177,735
Patented Apr. 13, 1965

3,177,735
ROTARY REGENERATOR DRIVING STRUCTURE
Richard Chute, Huntington Woods, Mich., assignor to Chrysler Corporation, Highland Park, Mich., a corporation of Delaware
Original application Sept. 12, 1960, Ser. No. 55,413. Divided and this application Feb. 13, 1961, Ser. No. 89,026
11 Claims. (Cl. 74—411)

This invention relates generally to gas turbine power plants or other fuel combustion apparatus and in particular to a drive mechanism for the rotary regenerator of a gas turbine engine. This application is a division of my copending application Serial No. 55,413, filed September 12, 1960.

Although the present invention is capable of being used with a large variety of different fuel combustion apparatus employing a regenerative combustion cycle, one preferred structural environment is disclosed which comprises a compact gas turbine power plant of the automotive type, the regenerator structure therefor including a circular matrix which is rotatably mounted about a central hub portion. The circular regenerator matrix in the disclosed power plant structure is mounted within a cast power plant frame or housing which encloses other component elements of the power plant. These other component elements of the power plant include a rotary compressor which is capable of receiving fuel combustion supporting air through suitable intake air ducts extending to the exterior of the power plant housing.

Optimum heat transfer efficiency in a regenerator of the above character requires a counterflow arrangement wherein the comparatively cool high pressure air from the compressor passes in one axial direction through one sector of the regenerator matrix and the comparatively high temperature gases resulting from the combustion of fuel in the engine pass in the opposite axial direction through the matrix. In consequence, one axial face of the regenerator matrix is exposed to comparatively cool gases whereas the opposite axial face is exposed to comparatively hot gases, such that the regenerator matrix is thermally distorted and bowed or dished slightly from the desired parallel plane condition to a concavo-convex condition, the cooler face being concave and the hotter face being convex.

In consequence of such a structure and the flow of gases at different temperatures and pressures through separate portions of the regenerator, the latter is subject to distortion during operation which has made difficult the provision of satisfactory means for rotatably driving the regenerator. Warping of the regenerator causes a variable dimensional relationship between elements of the drive mechanism closely associated with the regenerator, resulting in excessive wear and noise which are particularly objectionable in an automobile engine. Accordingly the choice and design of the type of regenerator drive has been seriously restricted and economy in its structure has been sacrificed.

An object of the present invention is to provide an improved economically manufactured and assembled drive for the regenerator of a gas turbine engine adapted for automotive use which avoids the above objections and which is particularly quiet and durable in operation.

Another object is to provide such a regenerator drive wherein the elements thereof directly associated with the regenerator are bathed in a flow of comparatively cool combustion supporting gases and are thereby shielded from the temperature extremes existing in the regenerator matrix. The problem of lubricating these elements is thereby simplified and thermal distortion thereof is minimized.

Another object is to provide such a drive mechanism for a rotary drum type regenerator having a coaxial peripheral rim, the drive mechanism including a ring gear arranged coaxially around the periphery of the rim and engaging the latter at substantially a line contact extending circumferentially around the rim. Thus upon warping of the regenerator, the rim can be distorted torsionally with respect to the ring gear without causing appreciable shifting of the ring gear from its desired coaxial alignment with the axis of rotation of the regenerator. A power driven pinion gear in mesh with the ring gear is accordingly readily maintained in substantially uniform driving engagement with the latter gear and alternate cycles of excessive binding and looseness with consequent noise and wear are minimized in the meshed gears.

Another and more specific object is to provide such a structure wherein the ring gear is radially spaced from the rim by means of an annular bead extending around the inner periphery of the ring gear and seating in an annular groove formed in the regenerator rim, the cross sectional area of the groove being greater than the corresponding area of the bead, so that the latter fits comparatively freely within the groove and makes the aforesaid line contact with the base of the groove.

Other objects of this invention will appear in the following description and appended claims, reference being had to the accompanying drawings forming a part of this specification wherein like reference characters designate corresponding parts in the several views.

FIGURE 1 is a fragmentary sectional view through the regenerator of a gas turbine engine.

FIGURE 2 is a fragmentary enlarged view similar to FIGURE 1, illustrating by phantom lines an exaggeration of the regenerator thermal expansion and warping during operation.

FIGURE 3 is an enlarged fragmentary view showing details of the regenerator hub mounting.

FIGURE 4 is a fragmentary sectional view through a portion of the regenerator drive gear train.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Upon operation of the gas turbine engine, for which the regenerator of FIGURE 1 is provided, an engine driven air compressor is operated to supply comparatively cool pressurized combustion supporting air to a dome-shaped cavity 24 located on the upper portion of the engine or power plant housing assembly 22, said cavity being defined by an upper housing cover 25 which is secured to the housing 22. The cavity 24 opens directly into an upper cylindrical regenerator containing chamber 27 defined in part by a part 22c of housing 22.

A rotary regenerator 28 in chamber 27 includes a drum-like matrix structure having a circular hub 29 and a rim 30, the hub 29 being reinforced at its upper and lower ends by cylindrical inserts 31 and 32 respectively, having upper and lower surfaces substantially flush with the upper and lower ends respectively of the hub 29, as illustrated in FIGURE 3. The insert 31 is firmly secured within hub 29 to comprise a unitary structure therewith and has a thickened upper part formed with a spherical inner surface 33 in bearing engagement with the concentric spherical outer bearing surface of a ball element 34. The latter is provided with an axial bore 35 centered with respect to the outer surface of ball 34 and comprising a cylindrical bearing surface rotatably and axially slidable on a coaxial vertical supporting shaft 36. The shaft 36 extends upward through the ball 34 and regenerator hub 29 and is secured by means of a nut 37 to an upper platform 25a of housing portion 25 and is recessed thereinto and covered by a suitable protective shield 38.

The lower end of shaft 36 projects beyond the lower end of the regenerator hub 29 and is provided with a threaded bore 39 screwed to an upwardly extending stud 40. The latter in turn is secured within a nut 41 welded to the top of an inverted channel-shaped bracket 42 extending generally diametrically below the regenerator 28 and having the lower edges of its depending sides suitably secured to an underlying supporting shelf of the housing portion 22.

Below the spherical surface 33, the insert 31 comprises an annular cylindrical extension 43 which receives an annular support 44 held in position by means of a snap ring 45 partially embedded into the lower end of extension 43 immediately below support 44. The latter is also provided with an interior spherical surface concentric with the surface of ball element 34 and cooperating with surface 33 to complete a universal type bearing engagement with the ball element 34. The interior bores of insert 31 and support 44 are appreciably larger than the diameter of shaft 36 to enable freedom of tilting or cocking of the regenerator matrix 28 about all axes perpendicular to the axis of shaft 36.

The lower insert 32 has upright cylindrical walls terminating in an upper inbent annular flange 46 to provide rigidity for the insert 32. The inner circumferential portions of the insert 32 are spaced adequately from shaft 36 so that the regenerator matrix 28 has in effect a freely floating mounting with respect to the shaft 36. The outer spherical surface of ball element 34 and its inner cylindrical surface 35 comprise suitable dry bearing surfaces such as graphite or a metallic oxide to enable both rotational and axial movement of the regenerator matrix 28, as well as the aforesaid tilting or cocking movement with respect to the shaft 36.

The regenerator rim 30 is provided with an annular groove 47 of circular cross section, FIGURE 4, which tightly receives a mating annular bead 48 integral with the inner periphery of a ring gear 49. The latter extends entirely around the regenerator rim 30 and is spaced slightly therefrom as illustrated, except at a region of snug contact between the bead 48 and base of the groove 47, to enable the axis of gear 49 to remain vertical regardless of tilting or warping of the regenerator matrix 28 or its supporting structure. In this regard the radius of the cross-section of groove 47 is preferably slightly greater than the corresponding radius of the bead 48. The inner circumference of the bead 48 seats against the base of groove 47 along a circumferentially extending line contact around the rim 30, thereby to accommodate the relative torsional movement of rim 30 with respect to the gear 49 during operation.

Preferably during assembly of the ring gear 49, the latter is expanded by being heated to approximately 700° F. to 800° F. The gear 49 is then passed over the rim 30 until the bead 48 aligns with groove 47. As the gear 49 cools, it shrinks into place with the inner periphery of the bead 48 seating snugly against the base of groove 47 to minimize noise that would otherwise result from free play between the gear 49 and rim 30. The lower edge of gear 49 is provided with an integral projection 50 which extends into a mating notch 51 in a bracket 52 secured to rim 30, thereby to key gear 49 to rim 30 for rotation together as a unit while enabling the adjacent sides of the rim 30 to deform during warping of the regenerator matrix 28 in the manner explained below.

The radially outwardly extending teeth of the gear 49 mesh with the teeth of a pinion gear 53 keyed to a shaft 54 for rotation therewith. The lower end of shaft 54 is journalled in a bearing block 55 having a tubular upper portion 56 terminating in an annular out-turned flange 57 which overlies a shelf or platform 25b of the housing portion 25. A window 58 is provided in tubular extension 56 at the region of the gear 53 to enable meshing engagement between the teeth of the latter and of the ring gear 49. Above the gear 53, the shaft 54 is journalled in a bearing block 59 having an annular flange 60 overlying flange 57 and secured thereto and to platform 25b by means of a plurality of bolts 61. The upper end of shaft 54 is keyed to the hub of a speed reducing gear 62 by means of a pin 63. Sealing bushings 64 and 65 respectively are interposed between gear 53 and block 59 and between block 59 and gear 62.

The peripheral teeth of speed reducing gear 62 mesh with a driving gear 66 keyed to the upper end of a vertical driveshaft 67 journalled in a bearing support 68 suitably supported by shelf 25b. The lower end of shaft 67 is operatively connected with an auxiliary gear system of the engine for rotation thereby, so that operation of the engine to supply the pressurized combustion supporting air results in simultaneous rotation of shaft 67, gears 66, 62, 53, and 49, and the regenerator matrix 28.

A support 69 is secured to the underside of platform 25b and maintained in fluid sealing engagement therewith by means of an interposed sealing gasket 70. A wall structure 71 welded to the support 69 extends to and is secured to the cylindrical housing portion 22c, so as to provide a fluid containing enlargement 27a of chamber 27 sufficient to accommodate the regenerator driving mechanism including pinion 53 and its supporting structure illustrated in FIGURE 4. Similarly to seal 70, sealing gaskets 72 and 73 are interposed between platform 25b and flange 57 and between the latter flange and flange 73, thereby to prevent undesirable loss of high pressure air from chambers 27 and 27a.

A core or body portion 75 of the regenerator matrix 28 comprises a pervious material having axially extending passages which are effective to conduct gases from one axial side thereof to the other. One typical construction comprises alternate layers of flat sheets and corrugated sheets which are wound about the hub 29 and which define the drum-like core 75. The individual sheets may be formed into an integral assembly by a suitable brazing operation, and the rim 30 may likewise be secured about the periphery of the core by a brazing operation. The alternately spaced corrugated sheets define the above-mentioned axially extending passages through the core body 75.

In accordance with the structure disclosed, the comparatively cool high pressure air entering chamber 24 pervades chamber 27 and its enlargements 27a so as to maintain the ring gear 49 and its driving pinion 53 in a cool temperature environment. In consequence, lubricating of the bearing surfaces for the spindle 54 and of the intermeshing teeth of gears 49 and 53 is facilitated and wearing of the parts is minimized. The compressed intake air passes from chamber 24 in a downward direction, through the regenerator core 75 into a chamber 76 disposed in part directly below the regenerator matrix 28, FIGURE 3. By reason of the pressure drop resulting from the flow of high pressure air through the restricted axial passages of the regenerator core 75, the pressure in chamber 76 will be at an intermediate value, somewhat below the pressure in chambers 24 and 27. Also as will be explained more fully below, air in its downward passage through the regenerator core from chamber 24 to chamber 76 is heated by the regenerator core, and the latter in turn is cooled.

Suitable baffling is provided for conducting the heated air from chamber 76 to a combustion chamber where fuel is added and burned. The combustion products may then be employed in accordance with customary practice to drive the engine. The exhaust gases are then conducted into an exhaust chamber 110 disposed below the regenerator matrix structure 28, FIGURE 2. The exhaust gases may then pass from the chamber 110 through the axially extending passages in the regenerator core to heat the latter, then into a dome-like exhaust chamber 111 defined by the power plant housing cover 25. A suitable exhaust conduit may be provided for conducting the exhaust gases from the chamber 111 to an external opening. In passing through the regenerator matrix, the gases are cooled in the process of heating the regenerator core. Also the pressure drop across the latter reduces the pressure of the gases in chamber 111 to slightly above atmospheric pressure.

Suitable baffles and seals, such as the seals 131 and 148 in FIGURE 3, confine the flow of combustion supporting air from chamber 24 to chamber 76 through an intermediate pressure region or area 113 of the regenerator core 75 at the left of its axis in FIGURE 1, and confine the flow of exhaust gases from chamber 110 to chamber 111 through the low pressure area or region 114 of the regenerator core 75 at the right of said axis. The openings into the regions 113 and 114 are also partly defined by the lower diametrical channel support 42 and an upper diametrical partitioning portion 117 of housing 22, which extend radially in opposite directions from shaft 36. A suitable insulating gasket 140 may be provided between the surface of the seal 131 and the housing portion 117, the assembly being secured to crossarm 117 by bolts 139. Inwardly with respect to the area 114, a portion 137 of seal 131 extends upwardly as a flange 141 which cooperates with an interior panel 142 lining chamber 111. The panel 142 is secured in place by a plurality of bolts 143 and retains a suitable insulating lining material 140a in position around the entire interior surface of chamber 111.

In accordance with the foregoing, it is apparent that air entering chamber 24 from the compressor is free to circulate entirely around the outer periphery of the regenerator matrix 28 within chamber 27 and the latter's extension 27a, thereby to bathe the regenerator and its driving mechanism in the comparatively cool high pressure air flow as aforesaid. The seals prevent the high pressure air in chambers 24 and 27 from bypassing the regenerator 28 and entering the area 114 or exhaust chamber 111; prevent the high pressure gases in chamber 27 and the intermediate pressure gases in chamber 76 from entering the area 114 except in accordance with the desired flow path from chamber 110; and prevent the high pressure air in chamber 27 from bypassing the regenerator and entering the intermediate pressure area or chamber 76 directly from chamber 27.

In consequence, the high pressure air in chamber 24 is directed axially downward through the portion of the regenerator core 75 within the area 113 and into the intermediate pressure chamber 76. This high pressure air is heated in its passage through the regenerator core 75. The hot exhaust gases from chamber 110 are similarly directly axially upward through the portion of the regenerator core 75, which is bounded by the low pressure area 114 and into the exhaust chamber 111, thereby to heat the regenerator core and appreciably reduce the temperature of the exhaust gases in chamber 111. As the regenerator 29 is rotated the regions 113 and 114 thereof are continuously interchanged.

By reason of the pressure differential acting generally diametrically across the regenerator matrix 28 between areas 113 and 114, and further in consequence of the constantly changing temperature distribution in the rotating regenerator core 75, the latter tends to warp upwardly at its peripheral edges with respect to its central axis. This warping is non-uniform around the periphery of the regenerator matrix 28 because of the asymmetric distribution of both the temperature and pressure. The slight spacing between ring gear 49 and regenerator rim 30 achieved by bead 48 accommodates this warping, whereby the portion of rim 30 at the groove 47 pivots on the bead 48 without twisting gear 49 out of its axial alignment with gear 53, as illustrated in FIGURE 4 wherein the extent of warping is exaggerated for the purpose of illustration. The cool upper portion of the regenerator 28 exposed to the comparatively cool gases in chambers 24 and 111 is subject to nominal radial expansion relative to ring gear 49, in contrast to the lower hot portion of the regenerator 28 exposed to the higher temperature gases in chambers 76 and 110. The axially aligned intermeshing teeth of gears 53 and 49 enable the resulting slight axial displacement of gear 49. Adequate operational clearance is of course provided between gears 49 and 53 for this purpose and also to accommodate the slight thermal expansion of ring gear 49 during operation.

I claim:

1. In a means for driving a rotary regenerator for a gas turbine engine, a rim for a regenerator having a circumferentially extending groove therein, driven means carried by said rim to rotate therewith, said driven means including a ring member coaxial with said rim and spaced radially therefrom to accommodate relative torsional movement of said rim with respect to said ring member, said driven means also including a bead secured to said ring member to rotate therewith, said bead extending circumferentially of said groove and radially therein sufficiently freely to accommodate said torsional movement, and means engaging said ring member to rotate the same.

2. In a means for driving a rotary regenerator for a gas turbine engine, a rim for a regenerator having a circumferentially extending groove therein, driven means including a ring member coaxial with said rim and spaced radially therefrom to accommodate relative torsional movement of said rim with respect to said ring member, said driven means also including a bead supported by said rim within said groove and being secured to said ring member to rotate therewith, said bead extending circumferentially of said groove and radially therein sufficiently freely to accommodate said torsional movement, said driven means and rim having portions engaging each other for rotation as a unit, and means engaging said ring member to rotate the same.

3. In a means for driving a rotary regenerator for a gas turbine engine, a rim for a regenerator, a ring extending coaxially around said rim and spaced radially therefrom to accommodate relative torsional movement of said rim with respect to said ring, means interconnecting said ring and rim to rotate as a unit and to accommodate said torsional movement, and means engaging said ring to rotate the same.

4. In a means for driving a rotary regenerator for a gas turbine engine, a rim for a regenerator having a groove extending circumferentially therein and opening radially outward, a ring gear extending coaxially around said rim and spaced radially therefrom to accommodate relative torsional movement of said rim with respect to said gear, means supporting said gear on said rim for rotation therewith and spacing said gear radially from said rim including a circumferential bead carried by the inner circumference of said gear and extending radially inwardly therefrom into said groove sufficiently freely to accommodate said torsional movement, and a power driven gear in mesh with said ring gear to drive the same.

5. In a means for driving a rotary regenerator for a gas turbine engine, a rim member for a regenerator, a ring gear member extending coaxially around said rim member and spaced radially therefrom to accommodate relative torsional movement of said rim member with respect to said gear member, means supporting said gear member on said rim member for rotation therewith and spacing said members radially including a circumferential bead carried by one of said members and extending radially therefrom sufficiently freely into a circumferential groove in the other member to accommodate said torsional movement, and a power driven gear in mesh with said gear member to drive the same.

6. In a means for driving a rotary regenerator for a gas turbine engine, a rim member for a regenerator, a ring member extending coaxially around said rim member and spaced radially therefrom to accommodate relative torsional movement of said rim member with respect to said ring member, means supporting said ring member on said rim member for rotation therewith and spacing said members radially including a circumferential bead carried by one of said members and extending radially therefrom sufficiently freely into a circumferential groove in the other member to accommodate said torsional movement, and means engaging said ring member to drive the same.

7. In combination with a rotatable drum, a motion imparting ring arranged coaxially with said drum, and spaced radially therefrom to accommodate relative torsional movement therebetween, means supporting said ring on said drum for rotation therewith and spacing said ring radially from said drum including portions carried by said ring at its inner circumference and effecting substantially a line contact with said drum to accommodate said distortion, and means engaging said ring to rotate the same.

8. In combination with a rotatable drum, a motion imparting ring arranged coaxially with said drum, circumferentially arranged portions carried by said drum and ring to interconnect the same for rotation as a unit and to space the same radially including means effecting substantially a line contact between said ring and drum to accommodate relative distortion therebetween, and means engaging said ring to effect a driving and driven relationship therebetween.

9. In combination, first and second annular members rotatable coaxially as a unit, a circumferentially extending bead carried by one of said members and spacing said members radially to accommodate relative torsional movement therebetween, said bead extending sufficiently freely into a circumferentially extending groove in the other of said members to accommodate said torsional movement, and means engaging said second member to effect a driving and driven relationship therebetween.

10. In combination, a rotary counterflow regenerator comprising a drum adapted for axial passage of comparatively cool gases therethrough from a cool axial end to a hot axial end and for axial passage of comparatively hot gases therethrough from said hot axial end to said cool axial end, a ring extending around the periphery of said drum adjacent said cool end thereof, means interconnecting said drum and ring to rotate as a unit and spacing said ring from said periphery to accommodate relative torsional movement of said drum with respect to said ring, and means engaging said ring to rotate the same.

11. In the combination according to claim 10, said ring comprising a ring gear having axially extending gear teeth on its radially outer side, and said means engaging said ring to rotate the same comprising a pinion gear having axially extending gear teeth meshed with the gear teeth of said ring gear.

References Cited by the Examiner
UNITED STATES PATENTS

| 932,064 | 8/09 | Slick | 74—448 |
|---|---|---|---|
| 2,963,279 | 12/60 | Vickland | 257—267 |
| 2,969,644 | 1/61 | Williams et al. | 60—39.57 |
| 3,093,009 | 6/63 | Collman et al. | 74—411 XR |

FOREIGN PATENTS 141,952   11/30   Switzerland.

DON A. WAITE, *Primary Examiner.*
HERBERT L. MARTIN, *Examiner.*